United States Patent
Zhang et al.

(10) Patent No.: US 9,484,830 B2
(45) Date of Patent: Nov. 1, 2016

(54) FIVE-LEVEL RECTIFIER

(71) Applicant: Delta Electronics (Shanghai) Co., Ltd., Shanghai (CN)

(72) Inventors: Bing Zhang, Shanghai (CN); Li-Feng Qiao, Shanghai (CN); Jian-Ping Ying, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 38 days.

(21) Appl. No.: 14/719,334

(22) Filed: May 22, 2015

(65) Prior Publication Data
US 2015/0340962 A1    Nov. 26, 2015

(30) Foreign Application Priority Data

May 23, 2014   (CN) .......................... 2014 1 0222827

(51) Int. Cl.
  *H02M 7/487*   (2007.01)
  *H02M 7/06*    (2006.01)
  *H02M 7/00*    (2006.01)
  *H02M 7/217*   (2006.01)

(52) U.S. Cl.
  CPC ............... *H02M 7/06* (2013.01); *H02M 7/003* (2013.01); *H02M 7/217* (2013.01); *H02M 7/487* (2013.01)

(58) Field of Classification Search
  CPC ........ H02M 7/06; H02M 7/217; H02M 7/42; H02M 7/44; H02M 7/48; H02M 7/483; H02M 7/487; H02M 7/49; H02M 7/537; H02M 7/5387; H02M 7/5388; H02M 7/003

USPC ............ 363/16–17, 34–43, 95–98, 125, 127, 363/131–132, 135–136, 84–89, 144, 146
  See application file for complete search history.

(56) References Cited

U.S. PATENT DOCUMENTS

| | | | |
|---|---|---|---|
| 5,625,545 A | 4/1997 | Hammond | |
| 6,028,779 A * | 2/2000 | Sakamoto | H02M 7/003 363/132 |
| 6,456,516 B1 * | 9/2002 | Bruckmann | H02M 7/003 363/144 |
| 8,547,717 B2 | 10/2013 | Kshirsagar | |
| 2013/0176014 A1 * | 7/2013 | Guan | G05F 3/08 323/311 |
| 2014/0111959 A1 * | 4/2014 | Li | H05K 7/026 361/809 |
| 2014/0169040 A1 * | 6/2014 | Schroeder | H02M 3/33507 363/21.01 |

(Continued)

FOREIGN PATENT DOCUMENTS

| | | |
|---|---|---|
| CN | 103259436 A | 8/2013 |
| TW | 285786 B | 9/1996 |

*Primary Examiner* — Timothy J Dole
*Assistant Examiner* — Ivan Laboy Andino
(74) *Attorney, Agent, or Firm* — CKC & Partners Co., Ltd.

(57) ABSTRACT

A five-level rectifier includes at least one phase bridge arm that includes an upper-half and a lower-half bridge arm circuit modules. The upper-half bridge arm circuit module includes a first power semiconductor switch unit, a second power semiconductor switch unit, a first diode unit, a second diode unit, a first connecting busbar, a first insulated wire and a first transfer busbar; the lower-half bridge arm circuit module includes a third power semiconductor switch unit, a fourth power semiconductor switch unit, a third diode unit, a fourth diode unit, a second connecting busbar, a second insulated wire and a second transfer busbar. The two modules are disposed side by side and facing each other.

20 Claims, 9 Drawing Sheets

(56) References Cited

U.S. PATENT DOCUMENTS

2014/0254228 A1* 9/2014 Ying .................. H02M 7/5387
    363/132

2015/0155770 A1* 6/2015 Ying ..................... H02M 7/217
    307/52

* cited by examiner

FIVE-LEVEL RECTIFIER

RELATED APPLICATIONS

This application claims priority to China Application Serial Number 201410222827.7, filed May 23, 2014, which is herein incorporated by reference.

BACKGROUND

1. Field of Invention

The present invention relates to rectifiers. More particularly, the present invention relates to five-level rectifiers.

2. Description of Related Art

Frequency converter has wide applications in industrial control, and is particularly important in the control and speed regulation of high-power electrical machines. Therefore, the frequency converter is an important part of the energy system. In the industrial applications, the large and medium-sized high-voltage electrical machines play more and more important roles, which consume about two-thirds of the gross power generation. Accordingly, it is significant to improve the efficiency of these machines.

The existing ROBICON solution (U.S. Pat. No. 5,625, 545) employs a frequency converter in which the high-voltage frequency conversion is achieved by a low voltage semiconductor component. However, the frequency converter according to the ROBICON solution requires a phase-shifting transformer disposed in the front, and hence, the transformer is costly and bulky and associated with more energy loss. Further, the ROBICON solution requires a large number of capacitors, resulting in higher cost and failure rate. In view of the foregoing, the solution is massive in volume, low in efficiency and inferior in reliability. Other high voltage frequency converter products use a high-voltage semiconductor component to achieve the high voltage frequency conversion, yet the high-voltage semiconductor is very expensive and associated with higher energy loss, and hence the cost of the system is high.

To overcome the above-mentioned disadvantages, the direct series connection of low-voltage semiconductor switches, such as the insulated-gate bipolar transistor (IGBT), may be a good approach (in which the semiconductor switches turn on or turn off simultaneously, and equivalently operate as a switch component). Meanwhile, to reduce the cost of the system, it is also desirable to replace the phase-shifting transformer with multi-level converter using series-connected low-voltage IGBTs. Currently, there are products with the 2-level converter in which a plurality of IGBTs in series connection are applied. However, the design layout of such products is defective due to the inferior maintainability, large commutation loop and high manufacturing cost.

In view of the foregoing, there exist problems and disadvantages in the current technology and further improvements are required for those ordinarily skilled in the art to solve the above-mentioned problems.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one aspect, the present disclosure provides five-level rectifiers with high power density, high reliability, and small stray inductance. The five-level rectifiers in modular design using semiconductor devices connected in series are easy to be installed and maintained, the lifetime of the switching components is increased, the commutation loop of the system is small and the configure is compact.

In a first embodiment, a five-level rectifier comprises at least one phase bridge arm, and the at least one phase bridge arm comprises an upper-half bridge arm circuit module and a lower-half bridge arm circuit module. The upper-half bridge arm circuit module comprises a first power semiconductor switch unit, a second power semiconductor switch unit, a first diode unit, a second diode unit, a first connecting busbar, a first insulated wire and a first transfer busbar, where the first diode unit is connected to the second diode unit in series, a connection point between the first power semiconductor switch unit and the second power semiconductor switch unit is connected to a positive terminal of a phase capacitor, the first diode unit is connected to a positive terminal of a first direct-current (DC) bus capacitor, the first connecting busbar is connected to the first diode unit and the second diode unit, the first transfer busbar is connected to the first power semiconductor switch unit and the second power semiconductor switch unit, and the first insulated wire is connected to the first transfer busbar and the first connecting busbar. The lower-half bridge arm circuit module comprises a third power semiconductor switch unit, a fourth power semiconductor switch unit, a third diode unit, a fourth diode unit, a second connecting busbar, a second insulated wire and a second transfer busbar, wherein the third diode unit is connected to the fourth diode unit in series, a connection point between the third power semiconductor switch unit and the fourth power semiconductor switch unit is connected to a negative terminal of the phase capacitor, the fourth diode unit is connected to a negative terminal of a second direct-current (DC) bus capacitor, the second diode unit and the third diode unit are connected to a neutral point connected between the first DC bus capacitor and the second DC bus capacitor, the second power semiconductor switch unit and the third power semiconductor switch unit are connected to an alternating-current terminal, the second connecting busbar is connected to the third diode unit and the fourth diode unit, the second transfer busbar is connected to the third power semiconductor switch unit and the fourth power semiconductor switch unit, the second insulated wire is connected to the second connecting busbar and the second transfer busbar, and the upper-half bridge arm circuit module and the lower-half bridge arm circuit module are disposed side by side and face each other.

In a second embodiment, a five-level rectifier comprises at least one phase bridge arm, and the at least one phase bridge arm comprises an upper-half bridge arm circuit module and a lower-half bridge arm circuit module. The upper-half bridge arm circuit module comprises a first power semiconductor switch unit, a second power semiconductor switch unit, a fifth power semiconductor switch unit, a first diode unit, a first connecting busbar, a first insulated wire and a first transfer busbar, wherein the first diode unit is connected to the fifth power semiconductor switch unit in series, a connection point between the first power semiconductor switch unit and the second power semiconductor switch unit is connected to a positive terminal of a phase capacitor, the first diode unit is connected to a positive terminal of a first direct-current (DC) bus capacitor, the first connecting busbar is connected to the first diode unit and the fifth power semiconductor switch unit, the first transfer busbar is connected to the first power semiconductor switch unit and the second power semiconductor switch unit, and the first insulated wire is connected to the first transfer busbar and the first connecting busbar. The lower-haft bridge arm circuit module comprises a third power semiconductor switch unit, a fourth power semiconductor switch unit, a sixth power semiconductor switch unit, a second diode unit, a second connecting busbar, a second insulated wire and a second transfer busbar, wherein the sixth power semiconductor switch unit is connected to the second diode unit in series, a connection point between the third power semiconductor switch unit and the fourth power semiconductor switch unit is connected to the negative terminal of the phase capacitor, the second diode unit is connected to a negative terminal of a second direct-current (DC) bus capacitor, the fifth power semiconductor switch unit and the sixth power semiconductor switch unit are connected to a neutral point connected between the first DC bus capacitor and the second DC bus capacitor, the second power semiconductor switch unit and the third power semiconductor switch unit are connected to an alternating-current terminal, the second connecting busbar is connected to the sixth power semiconductor switch unit and the second diode unit, the second transfer busbar is connected to the third power semiconductor switch unit and the fourth power semiconductor switch unit, the second insulated wire is connected to the second connecting busbar and the second transfer busbar, and the upper-half bridge arm circuit module and the lower-half bridge arm circuit module are disposed side by side and face each other.

In view of the foregoing, the technical solutions of the present disclosure result in significant advantageous and beneficial effects, compared with existing techniques. The implementation of the above-mentioned technical solutions achieves substantial technical improvements and provides utility that is widely applicable in the industry. Specifically, technical advantages generally attained, by embodiments of the present disclosure, include:

1. The proposed modular design uses half of the bridge arm as a module, and the upper-half bridge arm circuit and the lower-half bridge arm circuit are disposed side by side and facing each other; thereby facilitating the installation and replacement procedures and resulting in a compact structure with a smaller commutation loop and reduced stray inductance; and 2. The connecting elements are composed of a combination of connecting busbars (i.e., those made of conductive materials; such as copper busbar or aluminum) and insulated wires (i.e., insulated cables), as compared with other products in which all the connecting elements are busbars; in this way, the present disclosure effectively avoid the problem of local discharge (or partial discharge) resulted from the high-voltage during the connecting process of the system.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
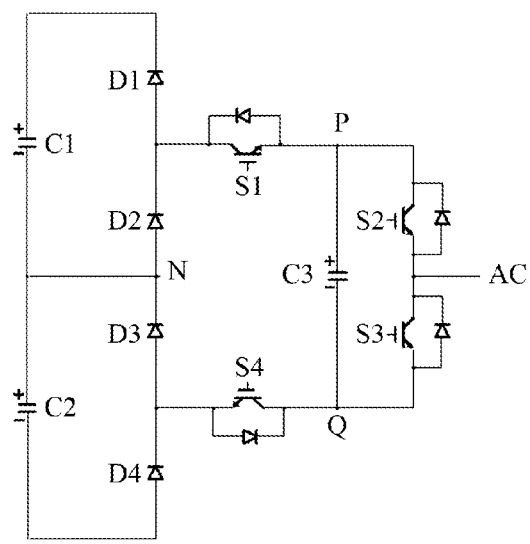
FIG. 1 is a schematic diagram illustrating the circuit of a five-level rectifier (single phase) according to the first embodiment of the present disclosure.

In the following detailed description, for purposes of explanation, numerous specific details are set forth in order to attain a thorough understanding of the disclosed embodiments. In accordance with common practice, the various described features/elements are not drawn to scale but instead are drawn to best illustrate specific features/elements relevant to the present invention. Also, like reference numerals and designations in the various drawings are used to indicate like elements/parts. Moreover, well-known structures and devices are schematically shown in order to simplify the drawing and to avoid unnecessary limitation to the claimed invention.

The technical solution of the present disclosure is directed to a five-level rectifier that could be used in frequency converters or widely applied in other related technical contexts. The component layout and connection framework of the five-level rectifier are discussed herein below in connection with FIGS. 1-6 according to the first embodiment and FIGS. 7-11 according to the second embodiment.

FIG. 1 is a schematic diagram illustrating the circuit of a five-level rectifier (single phase) according to the first embodiment of the present disclosure. As illustrated in FIG. 1, the five-level rectifier 100 comprises a first diode unit D1, a second diode unit D2, a third diode unit D3, a fourth diode unit D4, a first power semiconductor switch unit S1, a second power semiconductor switch unit S2, a third power semiconductor switch unit S3 and a fourth power semiconductor switch unit S4. In structure, the first diode unit D1 is connected to the second diode unit D2 in series, the connection point P between the first power semiconductor switch unit S1 and the second power semiconductor switch unit S2 is connected to the positive terminal of the phase capacitor C3, the first diode unit D1 is connected to the positive terminal of the first direct-current (DC) bus capacitor C1, the third diode unit D3 is connected to the fourth diode unit D4 in series, the connection point Q between the third power semiconductor switch unit S3 and the fourth power semiconductor switch unit S4 is connected to the negative terminal of the phase capacitor C3, the fourth diode unit D4 is connected to the negative terminal of the second direct-current (DC) bus capacitor C2, the second diode unit D2 and the third diode unit D3 are connected to the neutral point N connected between the first DC bus capacitor C1 and the second DC bus capacitor C2, the second power semiconductor switch unit S2 and the third power semiconductor switch unit S3 are connected to the alternating-current terminal AC.

More specifically, the first power semiconductor switch unit S1 has a collector and an emitter; the second power semiconductor switch unit S2 has a collector and an emitter; the third power semiconductor switch unit S3 has a collector and an emitter, wherein the emitter of the second power semiconductor switch unit S2 is connected to the collector of the third power semiconductor switch unit S3; the fourth power semiconductor switch unit S4 has a collector and an emitter; the first DC bus capacitor C1 has a positive terminal and a negative terminal; the second DC bus capacitor C2 has a positive terminal and a negative terminal; the first diode unit D1 has an anode and a cathode, wherein the positive terminal of the first DC bus capacitor C1 is connected to the cathode of the first diode unit D1; the second diode unit D2 has an anode and a cathode, wherein the anode of the first diode unit D1, the cathode of the second diode unit D2 and the collector of the first power semiconductor switch unit S1 are connected to each other; the third diode unit D3 has an anode and a cathode, wherein the negative terminal of the first DC bus capacitor C1, the positive terminal of the second DC bus capacitor C2, the anode of the second diode unit D2 and the cathode of the third diode unit D3 are connected to each other; the phase capacitor C3 has a positive terminal and a negative terminal, where the emitter of the first power semiconductor switch unit S1, the collector of the second power semiconductor switch unit S2 and the positive terminal of the phase capacitor C3 are connected to each other, the emitter of the third power semiconductor switch unit S3, the collector of the fourth power semiconductor switch unit S4 and the negative terminal of the phase capacitor C3 are connected to each other; the fourth diode unit D4 has an anode and a cathode, wherein the emitter of the fourth power semiconductor switch unit S4, the anode of the third diode unit D3 and the cathode of the fourth diode unit D4 are connected to each other, and the anode of the fourth diode unit D4 and the negative terminal of the second DC bus capacitor C2 are connected to each other.

In use, the first DC bus capacitor C1 and the second DC bus capacitor C2 can be connected to a common DC bus so as to get DC voltage, the phase capacitor C3 is configured to stabilize voltage, and the alternating-current terminal AC serves as one phase input terminal. A control module (not shown) outputs driving signals based on pulse with modulation (PWM) to control on/off states of the power semiconductor switch units S1-S4 respectively, so that the five-level rectifier 100 can operate for rectification. In another embodiment, the on/off states of the power semiconductor switch units S1-S4 can be controlled by pulse frequency modulation PFM, pulse amplitude modulation PAM, or the like, so that the five-level rectifier 100 can operate for rectification.

For a more complete understanding of the five-level rectifier 100, and the works thereof, with reference to a table 1 as to the on/off states of switching components (e.g., power semiconductor switches and diode modules) and output voltage level. The parameters are defined as follows. When the current flows into the rectifier in a positive direction, the current flows out of the rectifier in a negative direction. A voltage across the first DC bus capacitor C1 and a voltage across the second DC bus capacitor C2 are $V_{bus}/2$ each, a voltage across the phase capacitor C3 is $V_{bus}/4$, and an output phase voltage $V_{ON}$ is a potential difference between the alternating-current terminal AC and the neutral point N.

TABLE 1

| | S1 | S2 | S3 | S4 | D1 | D2 | D3 | D4 | $V_{ON}$ |
|---|---|---|---|---|---|---|---|---|---|
| State 1 | ON | ON | OFF | OFF | ON | OFF | OFF | OFF | $V_{bus}/2$ |
| State 2 | ON | OFF | ON | OFF | ON | OFF | OFF | OFF | $V_{bus}/4$ |
| State 3 | OFF | ON | OFF | ON | OFF | OFF | ON | OFF | $V_{bus}/4$ |
| State 4 | OFF | OFF | ON | ON | OFF | OFF | ON | OFF | 0 |
| State 5 | ON | ON | OFF | OFF | OFF | ON | OFF | OFF | 0 |
| State 6 | ON | OFF | ON | OFF | OFF | ON | OFF | OFF | $-V_{bus}/4$ |
| State 7 | OFF | ON | OFF | ON | OFF | OFF | OFF | ON | $-V_{bus}/4$ |
| State 8 | OFF | OFF | ON | ON | OFF | OFF | OFF | ON | $-V_{bus}/2$ |

Figure 2:
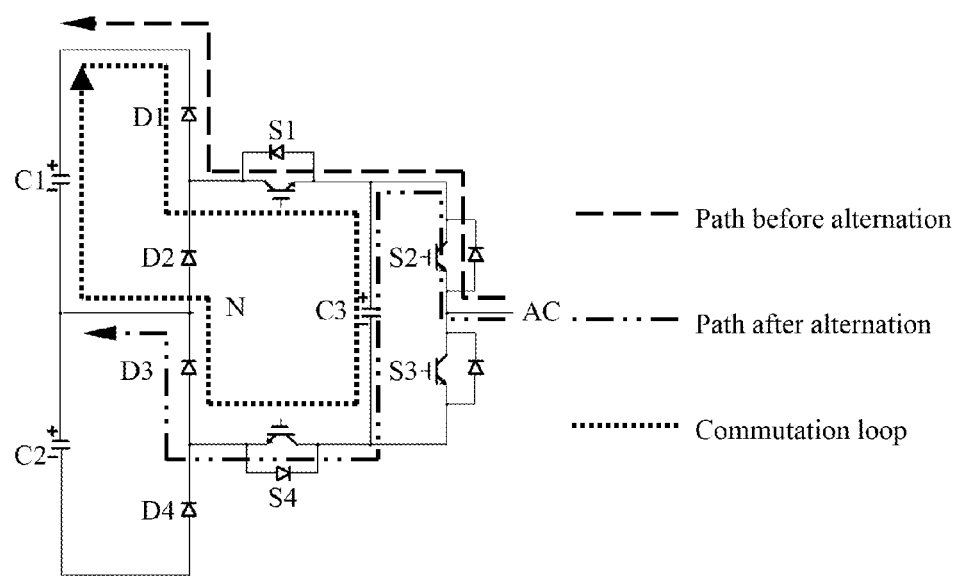
FIG. 2 illustrates one commutation loop of the five-level rectifier of FIG. 1.

FIG. 2 schematically depicts one commutation loop of the five-level rectifier 100 in operation. It should be noted that FIG. 2 illustrates the single commutation loop for illustrative purposes only, and that the five-level rectifier 100 may have various commutation loops or other operations. As could be appreciated, the commutation loops of the five-level rectifier 100 are well-known to persons having ordinary skill in the art, and they are not sought to be protected in the present disclosure; accordingly, detailed description thereof is omitted herein.

Figure 3:
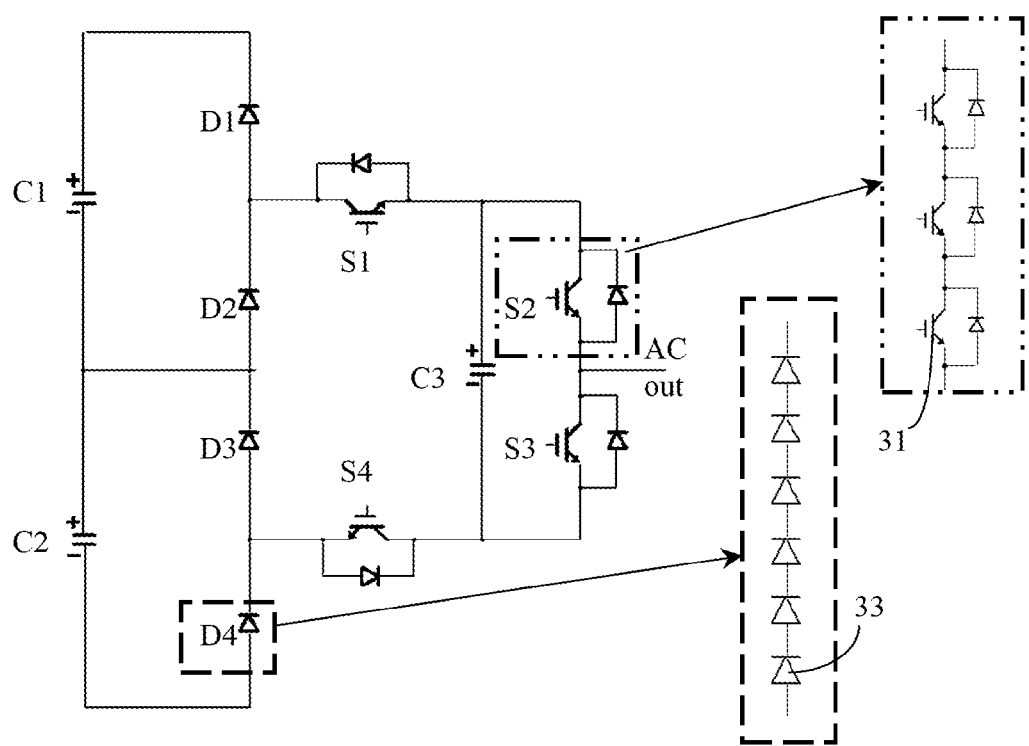
FIG. 3 is a schematic diagram illustrating a power semiconductor switch series circuit and a diode series circuit according to one embodiment of the present disclosure.

FIG. 3 is a schematic diagram illustrating a power semiconductor switch series circuit and a diode series circuit according to one embodiment of the present disclosure. As illustrated in FIG. 3, each power semiconductor switch unit includes a plurality of power semiconductor switches 31 connected in series (e.g., three switches as shown in FIG. 3), and each diode unit includes a plurality of diodes. It should be noted that the first diode unit D1, the second diode unit D2, the third diode unit D3 and the fourth diode unit D4 in structure are substantially equal to each other and each diode unit includes a plurality of diodes 33 connected in series (e.g., six diodes as shown in FIG. 3).

Figure 4A:
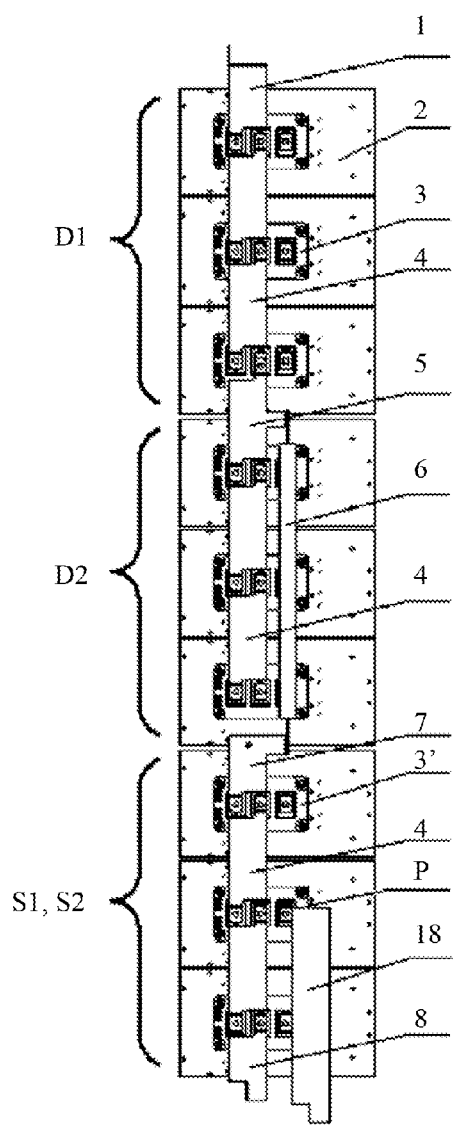
FIG. 4A and FIG. 4B respectively illustrate the circuit structure layout and connecting wires of an upper-half bridge arm according to the first embodiment of the present disclosure.
Figure 5A:
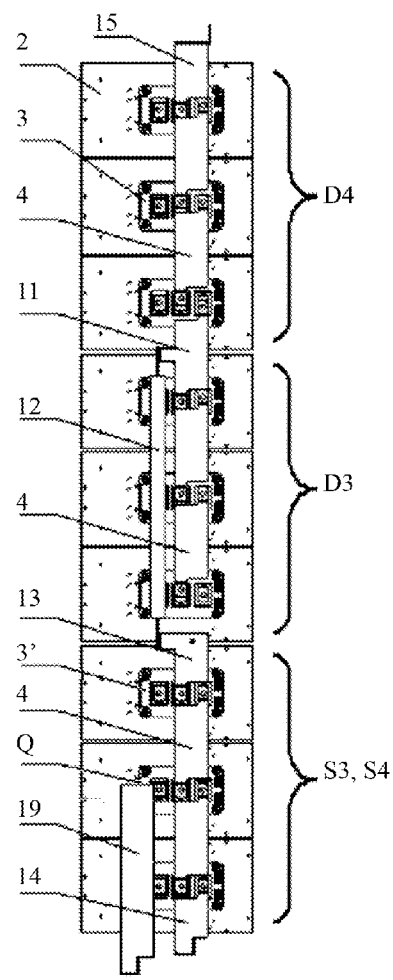
FIG. 5A and FIG. 5B respectively illustrate the circuit structure layout and connecting wires of a lower-half bridge arm according to the first embodiment of the present disclosure.

In the first embodiment, the structures of the power semiconductor switch units S1-S4 are shown in FIGS. 4A and 5A. The first semiconductor switch unit S1 and the second power semiconductor switch unit S2 include a plurality of power semiconductor switch modules 3' (e.g., three modules as shown in FIG. 4A) and a plurality of series busbars 4; similarly, the third semiconductor switch unit S3 and the fourth power semiconductor switch unit S4 include a plurality of power semiconductor switch modules 3' (e.g., three modules as shown in FIG. 5A) and a plurality of series busbars 4. The power semiconductor switch modules 3' are connected in series through the series busbar 4. In one embodiment, each power semiconductor switch module 3' includes two power semiconductor switches connected in series; in other words, all of the power semiconductor switch modules 3' in each power semiconductor switch unit have six power semiconductor switches 31 connected in series. The power semiconductor switch 31 is a full-controlled device, such as IGBT, but is not limited thereto. It should be noted that the busbars are manufactured from conductive materials such as copper and aluminum. For the sake of illustration, the description herein below uses the busbar as an example. Further, the power semiconductor switch module 3' is disposed on the heat dissipator 2.

In the first embodiment, the structure of the four diode units D1, D2, D3 and D4 is shown in FIGS. 4A and 5A, each of the first diode unit, the second diode unit, the third diode unit and the fourth diode unit comprises a plurality of diode module 3 (e.g., three diode modules as shown in FIGS. 4A and 5A) and a plurality of series busbars 4, wherein the diode modules 3 are connected in series through the series busbars 4 and disposed on the heat dissipator 2. Each diode module 3 includes two diodes connected in series; in other words, all of the diode modules 3 in each diode unit have six diodes 33 connected in series, as shown in FIG. 3.

As could be appreciated, although the above discussion is directed to six series-connected components, the present disclosure is not limited thereto. In practice, persons having ordinary skill in the art would adjust the number of the component as desired.

Figure 4B:
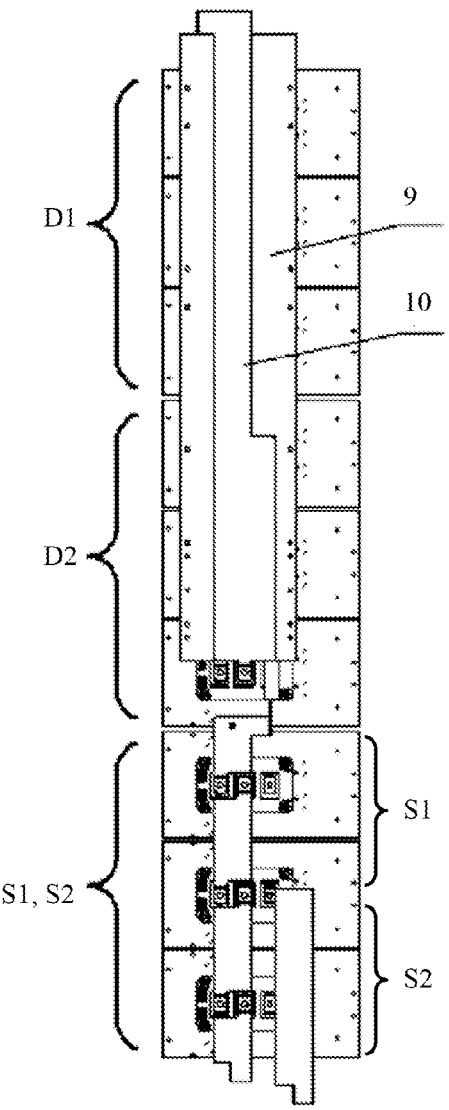
Figure 5B:
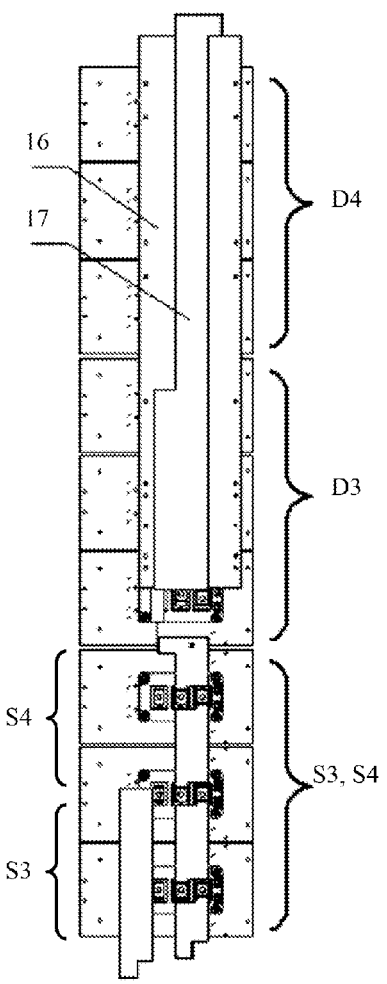
Figure 6:
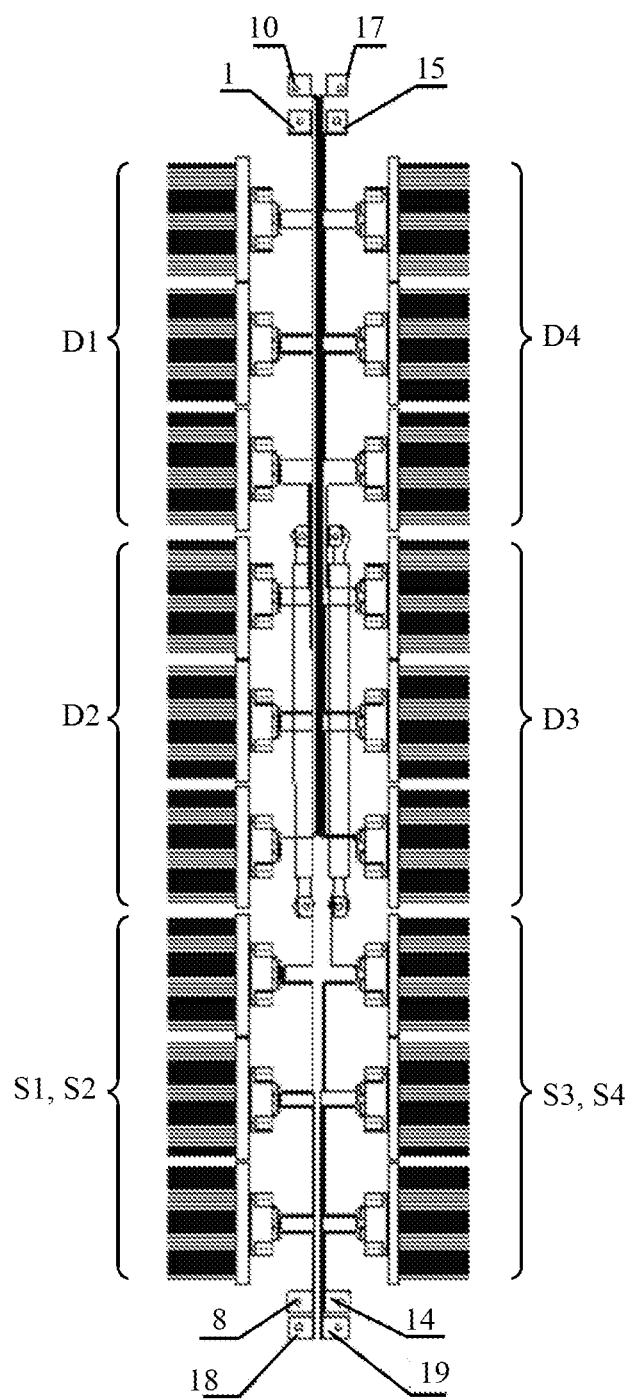
FIG. 6 is a structural diagram illustrating a single-phase bridge arm of a five-level rectifier according to the first embodiment of the present disclosure.

In the first embodiment, the structural design of the overall bridge arm is illustrated in FIG. 6. The structure of the upper-half bridge arm is depicted in FIG. 4A and FIG. 4B, and the upper-half bridge arm circuit module comprises the first power semiconductor switch unit S1, the second power semiconductor switch unit S2, the first diode unit D1 and the second diode unit D2. The structure of the lower-half bridge arm is depicted in FIG. 5A and FIG. 5B, and the lower-half bridge arm circuit module comprises the third power semiconductor switch unit S3, the fourth power semiconductor switch unit S4, the third diode unit D3 and the fourth diode unit D4.

In structural design, the first diode unit D1 is disposed at the upper portion of the upper-half bridge arm, the second diode unit D2 is disposed at the middle portion of the upper-half bridge arm, and the first power semiconductor switch unit S1 and the second power semiconductor switch unit S2 are disposed at the lower portion of the upper-half bridge arm; the fourth diode unit D4 is disposed correspondingly to the position of the first diode unit D1 and is located at the upper portion of the lower-half bridge arm, the third diode unit D3 is disposed correspondingly to the position of the second diode unit D2 and is located at the middle portion of the lower-half bridge arm, and the third semiconductor switch unit S3 and the fourth power semiconductor switch unit S4 are disposed correspondingly to the position of the first semiconductor switch unit S1 and the second power semiconductor switch unit S2 and are located at the lower portion of the lower-half bridge arm. The upper-half bridge arm circuit module and the lower-half bridge arm circuit module are disposed side by side and face each other in a substantially mirror relationship, and the thus-obtained overall structure is U-shape.

More specifically, the whole bridge arm as illustrated in FIG. 6, the first diode unit D1 faces the fourth diode unit D4, the second diode unit D2 faces the third diode unit D3, the first semiconductor switch unit S1 and the second power semiconductor switch unit S2 face the third semiconductor switch unit S3 and the fourth power semiconductor switch unit S4. The upper-half bridge arm circuit module as illustrated in FIG. 4A and FIG. 4B, the second diode unit D2 is positioned between the first diode unit D1 and a series of the first semiconductor switch unit S1 and the second power semiconductor switch unit S2, and the first diode unit D1, the second diode unit D2 and the first semiconductor switch unit S1 and the second power semiconductor switch unit S2 are arranged in a straight line; similarly, the lower-half bridge arm circuit module as depicted in FIG. 5A and FIG. 5B, the third diode unit D3 is positioned between the fourth diode unit D4 and a series of the third semiconductor switch unit S3 and the fourth power semiconductor switch unit S4, and the fourth diode unit D4, the third diode unit D3 and the third semiconductor switch unit S3 and the fourth power semiconductor switch unit S4 are arranged in a straight line.

In view of the foregoing, the present disclosure provides a novel component layout of five-level rectifier 100. The characteristics of the present layout include: providing a modular design using half bridge arm as a module, and the upper-half bridge arm circuit and the lower-half bridge arm circuit being disposed side by side and facing each other, thereby facilitating the installation and replacement thereof, and resulting in a compact structure, reducing the commutation loop area of the rectifier and decreasing the stray inductance.

Another feature of the structure provided by the present disclosure is the way in which the components are connected. In the first embodiment, the connection arrangement of the upper-half bridge arm, in the five-level rectifier is illustrated in FIGS. 4A and 4B. Specifically, FIG. 4A shows the first layer structure, in which the first connecting busbar 5 is connected to the first diode unit D1 and the second diode unit D2, the first transfer busbar 7 is connected to the first semiconductor switch unit S1 and the second power semiconductor switch unit S2, the first insulated wire 6 (e.g., an insulated wire resistant to partial discharge) is connected to the first transfer busbar 7 and the first connecting busbar 5, the positive conductor of the capacitance bus 1 connects the first diode unit D1 to the positive terminal of the first DC bus capacitor C1 (shown in FIG. 1), the first alternating-current connecting busbar 8 connects the second power semiconductor switch unit S2 to the alternating-current terminal AC (shown in FIG. 1), the positive side conductor 18 connects the connection point P between the first semiconductor switch unit S1 and the second power semiconductor switch unit S2 to the positive terminal of the phase capacitor C3 (shown in FIG. 1). FIG. 4B shows the second layer structure, in which the first neutral point connecting busbar 10 connects the second diode unit D2 to the neutral point N (shown in FIG. 1), the insulating board 9 is disposed on the first diode unit D1 and the second diode unit D2, and the first neutral point connecting busbar 10 is disposed on the insulating board 9, so that the first neutral point connecting busbar 10 can be electrically isolated from the other conductors of the upper-half bridge arm.

In the first embodiment, the connection arrangement of the lower-half bridge arm is shown in FIGS. 5A and 5B. Specifically, FIG. 5A shows the first layer structure, in which the second connecting busbar 11 is connected to the third diode unit D3 and the fourth diode unit D4, the second transfer busbar 13 is connected to the third power semiconductor switch unit S3 and the fourth power semiconductor switch unit S4, the second insulated wire 12 is connected to the second connecting busbar 11 and the second transfer busbar 13, the negative conductor of the capacitance bus 15 connects the fourth diode unit D4 to the negative terminal of the second DC bus capacitor C2 (shown in FIG. 1), the second alternating-current connecting busbar 14 is connected to the third power semiconductor switch unit S3 and the alternating-current terminal AC (shown in FIG. 1), the negative side conductor 19 connects the connection point Q between the third power semiconductor switch unit S3 and the fourth power semiconductor switch unit S4 to the negative terminal of the phase capacitor C3 (shown in FIG. 1). FIG. 5B shows the second layer structure, in which the second neutral point connecting busbar 17 connects the third diode unit D3 to the neutral point N (shown in FIG. 1), the insulating board 16 is disposed on the third diode unit D3 and the fourth diode unit D4, and the second neutral point connecting busbar 17 is disposed on the insulating board 16, so that the second neutral point connecting busbar 17 can be electrically isolated from the other conductors of the lower-half bridge arm.

Specifically, the whole bridge arm is illustrated in FIG. 6, in which the upper-half bridge arm circuit module comprises the first diode unit D1, the second diode unit D2, the first power semiconductor switch unit S1 and the second power semiconductor switch unit S2 sequentially connected to the positive conductor of the capacitance bus 1, the first neutral point connecting busbar 10, the positive side conductor 18 and the first alternating-current connecting busbar 8, wherein the positive conductor of the capacitance bus 1 can be electrically connected to the positive terminal of the first DC bus capacitor C1 (shown in FIG. 1), the first neutral point connecting busbar 10 can be electrically connected to the neutral point N (shown in FIG. 1), the positive side conductor 18 can be electrically connected to the positive terminal of the phase capacitor C3 (shown in FIG. 1), the first AC connecting busbar 8 can be electrically connected to the alternating-current terminal AC (shown in FIG. 1). The lower-half bridge arm circuit module comprises the fourth diode unit D4, the third diode unit D3, the third power semiconductor switch unit S3 and the fourth power semiconductor switch unit S4 sequentially connected to the negative conductor of the capacitance bus 15, the second neutral point connecting busbar 17, the second alternating-current connecting busbar 14 and the negative side conductor 19, wherein the negative conductor of the capacitance bus 15 can be electrically connected to the negative terminal of the second DC bus capacitor C2 (shown in FIG. 1), the second neutral point connecting busbar 17 can be electrically connected to the neutral point N (shown in FIG. 1), the negative side conductor 19 can be electrically connected to the negative terminal of the phase capacitor C3 (shown in FIG. 1), the second AC connecting busbar 14 can be electrically connected to the alternating-current terminal AC (shown in FIG. 1).

In view of the foregoing, the connection framework provided by the first embodiment has the following characteristics: the connecting elements are composed of a combination of connecting busbars (such as the copper busbar) and insulated wires, as compared with other products and patents in which all the connecting elements are busbars; in this way, the present disclosure effectively avoid the problem of partial discharge resulted from the high-voltage during the connecting process of the system; there are only two layers of connecting busbar for connecting the half bridge arms, the structure is simple and the manufacturing cost is reduced.

Figure 7:
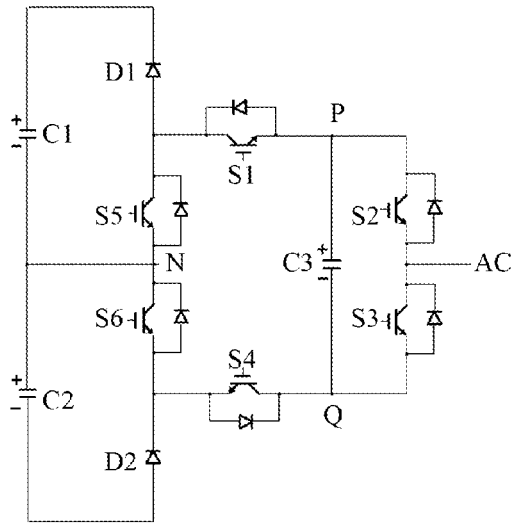
FIG. 7 is a schematic diagram illustrating the circuit of a five-level rectifier (single phase) according to the second embodiment of the present disclosure.

FIG. 7 is a schematic diagram illustrating the circuit of a five-level rectifier (single phase) according to the second embodiment of the present disclosure. As illustrated in FIG. 7, the five-level rectifier 200 comprises a first diode unit D1, a second diode unit D2, a first power semiconductor switch unit S1, a second power semiconductor switch unit S2, a third power semiconductor switch unit S3, a fourth power semiconductor switch unit S4, a fifth power semiconductor switch unit S5 and a sixth power semiconductor switch unit S6. In structure, the first diode unit D1 is connected to the fifth power semiconductor switch unit S5 in series, the connection point P between the first power semiconductor switch unit S1 and the second power semiconductor switch unit S2 is connected to the positive terminal of the phase capacitor C3, the first diode unit D1 is connected to the positive terminal of the first DC bus capacitor C1, the sixth power semiconductor switch unit S6 is connected to the second diode unit D2 in series, the connection point Q between the third power semiconductor switch unit S3 and the fourth power semiconductor switch unit S4 is connected to the negative terminal of the phase capacitor C3, the second diode unit D2 is connected to the negative terminal of the second DC bus capacitor C2, the fifth power semiconductor switch unit S5 and the sixth power semiconductor switch unit S6 are connected to the neutral point N connected between the first DC bus capacitor C1 and the second DC bus capacitor C2, the second power semiconductor switch unit S2 and the third power semiconductor switch unit S3 are connected to the alternating-current terminal AC.

More specifically, the first power semiconductor switch unit S1 has a collector and an emitter; the second power semiconductor switch unit S2 has a collector and an emitter; the third power semiconductor switch unit S3 has a collector and an emitter, wherein the emitter of the second power semiconductor switch unit S2 is connected to the collector of the third power semiconductor switch unit S3; the fourth power semiconductor switch unit S4 has a collector and an emitter; the fifth power semiconductor switch unit S5 has a collector and an emitter; the sixth power semiconductor switch unit S6 has a collector and an emitter; the first diode unit D1 has an anode and a cathode, wherein the anode of the first diode unit D1, the collector of the first power semiconductor switch unit S1 and the collector of the fifth power semiconductor switch unit S5 are connected to each other; the first DC bus capacitor C1 has a positive terminal and a negative terminal, wherein the positive terminal of the first DC bus capacitor C1 is connected to the cathode of the first diode unit D1; the second DC bus capacitor C2 has a positive terminal and a negative terminal, wherein the negative terminal of the first DC bus capacitor C1, the positive terminal of the second DC bus capacitor C2, the emitter of the fifth power semiconductor switch unit S5 and the collector of the sixth power semiconductor switch unit S6 are connected to each other; the phase capacitor C3 has a positive terminal and a negative terminal, wherein the emitter of the first power semiconductor switch unit S1, the collector of the second power semiconductor switch unit S2 and the positive terminal of the phase capacitor C3 are connected to each other, the emitter of the third power semiconductor switch unit S3, the collector of the fourth power semiconductor switch unit S4 and the negative terminal of the phase capacitor C3 are connected to each other; the second diode unit D2 has an anode and a cathode, wherein the emitter of the sixth power semiconductor switch unit S6, the emitter of the fourth power semiconductor switch unit S4 and the cathode of the second diode unit D2 are connected to each other, and the anode of the second diode unit D2 is connected to the negative terminal of the second DC bus capacitor C2.

In use, the first DC bus capacitor C1 and the second DC bus capacitor C2 can be connected to a common DC bus so as to get DC voltage, the phase capacitor C3 is configured to stabilize voltage, and the alternating-current terminal AC serves as one phase input terminal. A control module (not shown) outputs driving signals based on pulse with modulation (PWM) to control on/off states of the power semiconductor switch units S1-S6 respectively, so that the five-level rectifier 200 can operate for rectification. In another embodiment, the on/off states of the power semiconductor switch units S1-S6 can be controlled by pulse frequency modulation PFM, pulse amplitude modulation PAM, or the like, so that the five-level rectifier 200 can operate for rectification.

For a more complete understanding of the five-level rectifier 200, and the works thereof, with reference to a table 2 as to the on/off states of switching components (e.g., power semiconductor switches and diode modules) and output voltage level. The parameters are defined as follows. When the current flows into the rectifier in a positive direction, the current flows out of the rectifier in a negative direction. A voltage across the first DC bus capacitor C1 and a voltage across the second DC bus capacitor C2 are $V_{bus}/2$ each, a voltage across the phase capacitor C3 is $V_{bus}/4$, and an output phase voltage $V_{ON}$ is a potential difference between the alternating-current terminal AC and the neutral point N.

TABLE 2

|  | S1 | S2 | S3 | S4 | S5 | S6 | D1 | D2 | $V_{ON}$ |
|---|---|---|---|---|---|---|---|---|---|
| State 1 | ON | ON | OFF | OFF | OFF | OFF | ON | OFF | $V_{bus}/2$ |
| State 2 | ON | OFF | ON | OFF | OFF | OFF | ON | OFF | $V_{bus}/4$ |
| State 3 | OFF | ON | OFF | ON | OFF | ON | OFF | OFF | $V_{bus}/4$ |
| State 4 | OFF | OFF | ON | ON | OFF | ON | OFF | OFF | 0 |
| State 5 | ON | ON | OFF | OFF | ON | OFF | OFF | OFF | 0 |
| State 6 | ON | OFF | ON | OFF | ON | OFF | OFF | OFF | $-V_{bus}/4$ |
| State 7 | OFF | ON | OFF | ON | OFF | OFF | OFF | ON | $-V_{bus}/4$ |
| State 8 | OFF | OFF | ON | ON | OFF | OFF | OFF | ON | $-V_{bus}/2$ |

Figure 8:
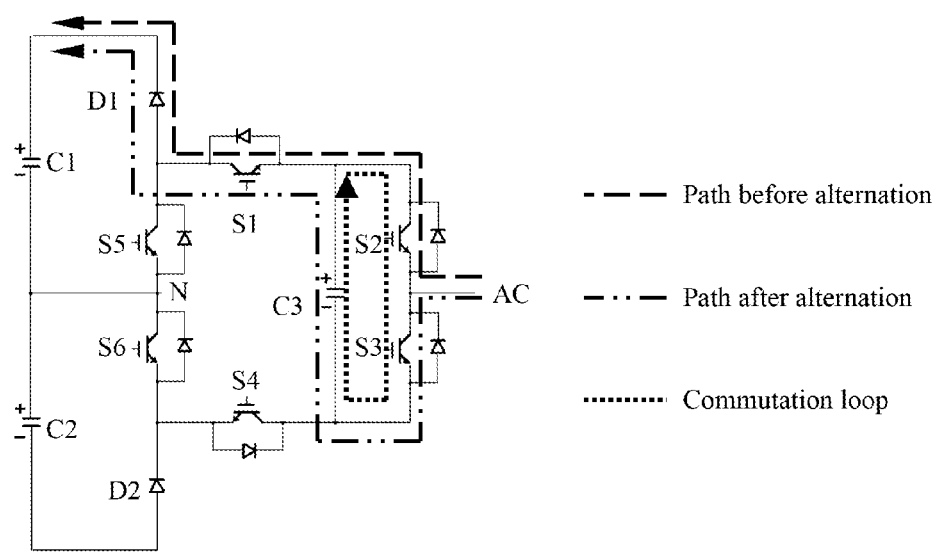
FIG. 8 illustrates one commutation loop of the five-level rectifier of FIG. 7.

FIG. 8 schematically depicts one commutation loop of the five-level rectifier 200 in operation. It should be noted that FIG. 8 illustrates the single commutation loop for illustrative purposes only, and that the five-level rectifier 200 may have various commutation loops or other operations. As could be appreciated, the commutation loops of the five-level rectifier 200 are well-known to persons having ordinary skill in the art, and they are not sought to be protected in the present disclosure; accordingly, detailed description thereof is omitted herein.

Figure 9A:
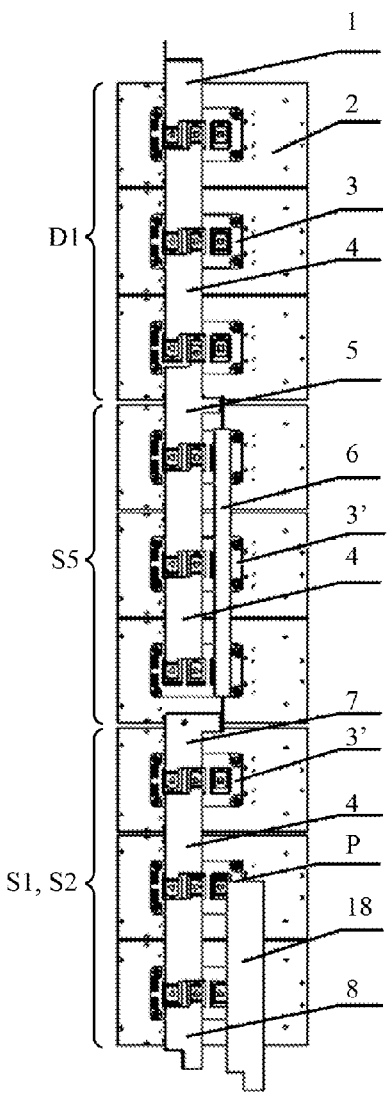
FIG. 9A and FIG. 9B respectively illustrate the circuit structure layout and connecting wires of an upper-half bridge arm according to the second embodiment of the present disclosure.
Figure 10A:
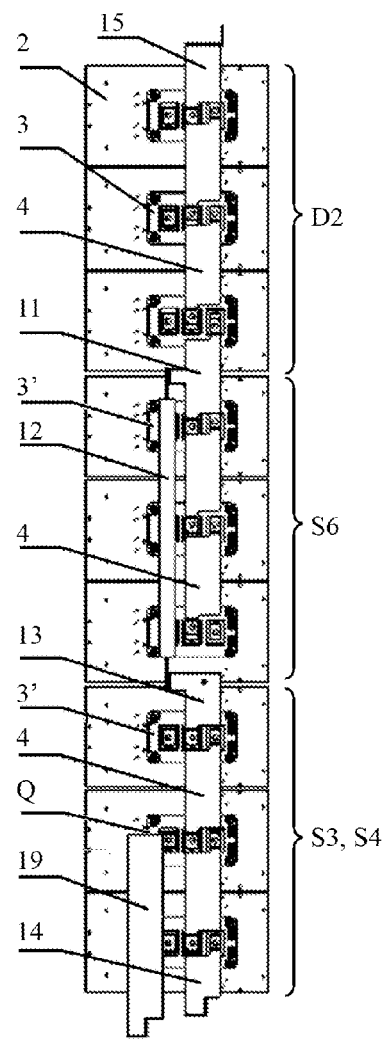
FIG. 10A and FIG. 10B respectively illustrate the circuit structure layout and connecting wires of a lower-half bridge arm according to the second embodiment of the present disclosure.

In the second embodiment, the structures of the power semiconductor switch units S1-S6 are shown in FIGS. 9A and 10A. In FIG. 9A, the first power semiconductor switch unit S1 and the second power semiconductor switch unit S2 include a plurality of power semiconductor switch modules 3' (e.g., three modules as shown in FIG. 9A) and a plurality of series busbars 4; similarly, the fifth power semiconductor switch unit S5 includes a plurality of power semiconductor switch modules 3' (e.g., three modules as shown in FIG. 9A) and a plurality of series busbars 4. In FIG. 10A, the third power semiconductor switch unit S3 and the fourth power semiconductor switch unit S4 includes a plurality of power semiconductor switch modules 3' (e.g., three modules as shown in FIG. 10A) and a plurality of series busbars 4; similarly, the sixth power semiconductor switch unit S6 includes a plurality of power semiconductor switch modules 3' (e.g., three modules as shown in FIG. 10A) and a plurality of series busbars 4. The power semiconductor switch modules 3' are connected in series through the series busbar 4. In one embodiment, each power semiconductor switch module 3' includes two power semiconductor switches connected in series; in other words, all of the power semiconductor switch modules 3' in each power semiconductor switch unit have six power semiconductor switches 31 connected in series. The power semiconductor switch is a full-controlled device, such as IGBT, but is not limited thereto. It should be noted that the busbars are manufactured from conductive materials such as copper and aluminum. For the sake of illustration, the description herein below uses the busbar as an example. Further, the power semiconductor switch module 3' is disposed on the heat dissipator 2.

In the second embodiment, the structure of the two diode units D1 and D2 is shown in FIGS. 9A and 10A, each of the first diode unit and the second diode unit comprises a plurality of diode modules 3 (e.g., three diode modules as shown in FIGS. 9A and 10A) and a plurality of series busbars 4, wherein the diode modules 3 are connected in series through the series busbar 4 and disposed on the heat dissipator 2. Each diode module 3 includes two diode connected in series.

In structural design, the first diode unit D1 is disposed at the upper portion of the upper-half bridge arm, the fifth power semiconductor switch unit S5 is disposed at the middle portion of the upper-half bridge arm, and the first power semiconductor switch unit S1 and the second power semiconductor switch unit S2 are disposed at the lower portion of the upper-half bridge arm; the second diode unit D2 is disposed correspondingly to the position of the first diode unit D1 and is located at the upper portion of the lower-half bridge arm, the sixth power semiconductor switch unit S6 is disposed correspondingly to the position of the fifth power semiconductor switch unit S5 and is located at the middle portion of the lower-half bridge arm, and the third power semiconductor switch unit S3 and the fourth power semiconductor switch unit S4 are disposed correspondingly to the position of the first power semiconductor switch unit S1 and the second power semiconductor switch unit S2 and are located at the lower portion of the lower-half bridge arm. The upper-half bridge arm circuit module and the lower-half bridge arm circuit module are disposed side by side and face each other in a substantially mirror relationship, and the thus-obtained overall structure is U-shape.

Figure 9B:
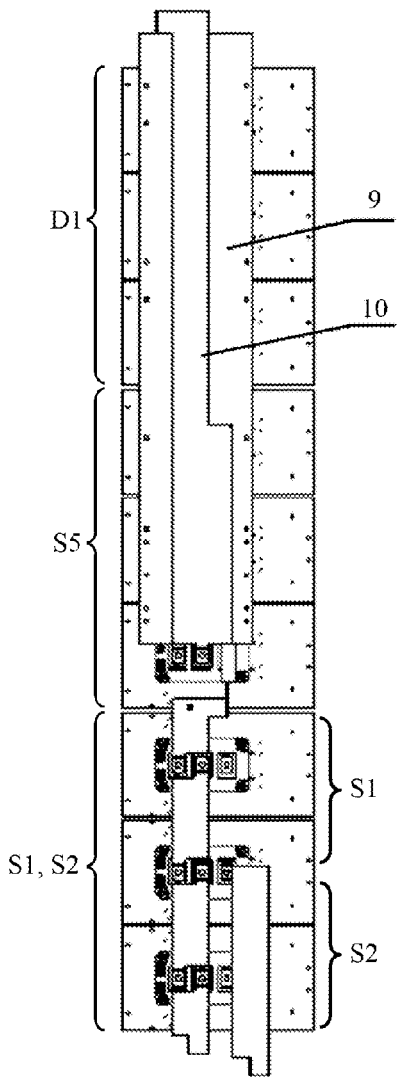
Figure 10B:
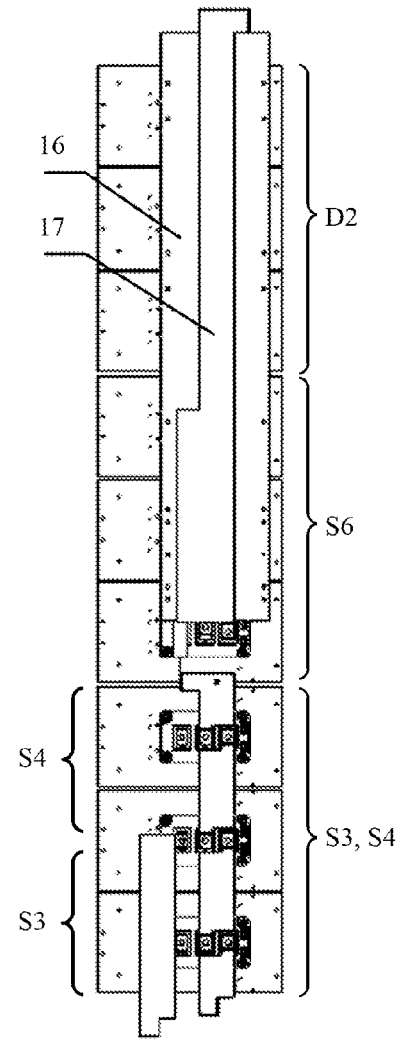
Figure 11:
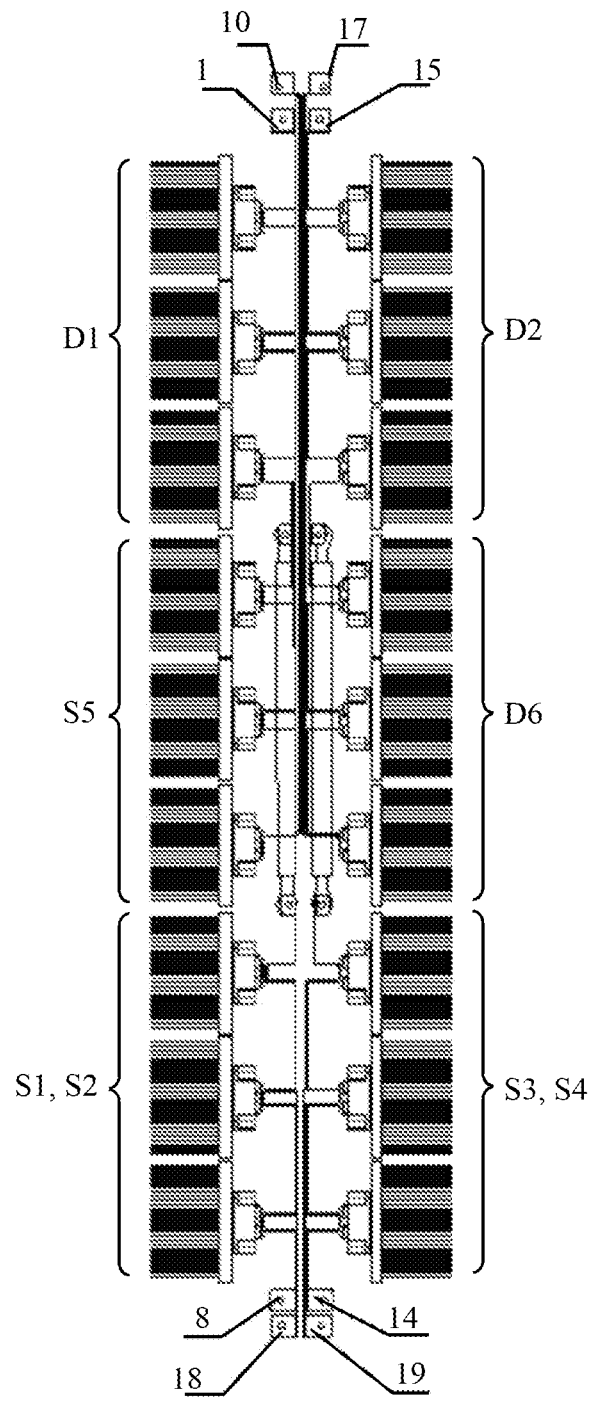
FIG. 11 is a structural diagram illustrating a single-phase bridge arm of a five-level rectifier according to the second embodiment of the present disclosure.

More specifically, the whole bridge arm as illustrated in FIG. 11, the first diode unit D1 faces the second diode unit D2, the fifth power semiconductor switch unit S5 faces the sixth power semiconductor switch unit S6, the first power semiconductor switch unit S1 and the second power semiconductor switch unit S2 face the third power semiconductor switch unit S3 and the fourth power semiconductor switch unit S4. The upper-half bridge arm circuit module as illustrated in FIG. 9A and FIG. 9B, the fifth power semiconductor switch unit S5 is positioned between the first diode unit D1 and a series of the first power semiconductor switch unit S1 and the second power semiconductor switch unit S2, and the first diode unit D1, the fifth power semiconductor switch unit S5 and the first power semiconductor switch unit S1 and the second power semiconductor switch unit S2 are arranged in a straight line; similarly, the lower-half bridge arm circuit module as illustrated in FIG. 10A and FIG. 10B, the sixth power semiconductor switch unit S6 is positioned between the second diode unit D2 and a series of the third power semiconductor switch unit S3 and the fourth power semiconductor switch unit S4, and the second diode unit D2, the sixth power semiconductor switch unit S6 and the third power semiconductor switch unit S3 and the fourth power semiconductor switch unit S4 are arranged in a straight line.

In view of the foregoing, the present disclosure provides a novel component layout of five-level rectifier 200. The characteristics of the present layout include: providing a modular design using half bridge arm as a module, and the upper-half bridge arm circuit and the lower-half bridge arm circuit being disposed side by side and facing each other, thereby facilitating the installation and replacement thereof, and resulting in a compact structure, reducing the commutation loop area of the rectifier and decreasing the stray inductance.

Another feature of the structure provided by the present disclosure is the way in which the components are connected. In the second embodiment, the connection arrangement of the upper-half bridge arm, in the five-level rectifier is illustrated in FIGS. 9A and 9B. Specifically, FIG. 9A shows the first layer structure, in which the first connecting busbar 5 is connected to the first diode unit D1 and the fifth power semiconductor switch unit S5, the first transfer busbar 7 is connected to the first power semiconductor switch unit S1 and the second power semiconductor switch unit S2, the first insulated wire 6 (e.g., an insulated wire resistant to partial discharge) is connected to the first transfer busbar 7 and the first connecting busbar 5, the positive conductor of the capacitance bus 1 connects the first diode unit D1 to the positive terminal of the first DC bus capacitor C1 (shown in FIG. 7), the first AC connecting busbar 8 connects the second power semiconductor switch unit S2 to the alternating-current terminal AC (shown in FIG. 7), the positive side conductor 18 connects the connection point P between the first power semiconductor switch unit S1 and the second power semiconductor switch unit S2 to the positive terminal of the phase capacitor C3 (shown in FIG. 7). FIG. 9B shows the second layer structure, in which the first neutral point connecting busbar 10 connects the fifth power semiconductor switch unit S5 to the neutral point N (shown in FIG. 7), the insulating board 9 is disposed on the first diode unit D1 and the fifth power semiconductor switch unit S5, and the first neutral point connecting busbar 10 is disposed on the insulating board 9, so that the first neutral point connecting busbar 10 can be electrically isolated from the other conductors of the upper-half bridge arm.

In the second embodiment, the connection arrangement of the lower-half bridge arm is shown in FIGS. 10A and 10B. Specifically, FIG. 10A shows the first layer structure, in which the second connecting busbar 11 is connected to the sixth power semiconductor switch unit S6 and the second diode unit D2, the second transfer busbar 13 is connected to the third power semiconductor switch unit S3 and the fourth power semiconductor switch unit S4, the second insulated wire 12 is connected to the second connecting busbar 11 and the second transfer busbar 13, the negative conductor of the capacitance bus 15 connects the second diode unit D2 to the negative terminal of the second DC bus capacitor C2 (shown in FIG. 7), the second AC connecting busbar 14 is connected to the third power semiconductor switch unit S3 and the alternating-current terminal AC (shown in FIG. 7), the negative side conductor 19 connects the connection point Q between the third power semiconductor switch unit S3 and the fourth power semiconductor switch unit S4 to the negative terminal of the phase capacitor C3 (shown in FIG. 7). FIG. 10B shows the second layer structure, in which the second neutral point connecting busbar 17 connects the sixth power semiconductor switch unit S6 to the neutral point N (shown in FIG. 7), the insulating board 16 is disposed on the second diode unit D2 and the sixth power semiconductor switch unit S6, and the second neutral point connecting busbar 17 is disposed on the insulating board 16, so that the second neutral point connecting busbar 17 can be electrically isolated from the other conductors of the lower-half bridge arm.

Specifically, the whole bridge arm is illustrated in FIG. 11, in which the upper-half bridge arm circuit module comprises the first diode unit D1, the fifth power semiconductor switch unit S5, the first power semiconductor switch unit S1 and the second power semiconductor switch unit S2 sequentially connected to the positive conductor of the capacitance bus 1, the first neutral point connecting busbar 10, the positive side conductor 18 and the first alternating-current connecting busbar 8, wherein the positive conductor of the capacitance bus 1 can be electrically connected to the positive terminal of the first DC bus capacitor C1 (shown in FIG. 7), the first neutral point connecting busbar 10 can be electrically connected to the neutral point N (shown in FIG. 7), the positive side conductor 18 can be electrically connected to the positive terminal of the phase capacitor C3 (shown in FIG. 7), the first AC connecting busbar 8 can be electrically connected to the alternating-current terminal AC (shown in FIG. 7). The lower-half bridge arm circuit module comprises the second diode unit D2, the sixth power semiconductor switch unit S6, the third power semiconductor switch unit S3 and the fourth power semiconductor switch unit S4 sequentially connected to the negative conductor of the capacitance bus 15, the second neutral point connecting busbar 17, the second alternating-current connecting busbar 14 and the negative side conductor 19, wherein the negative conductor of the capacitance bus 15 can be electrically connected to the negative terminal of the second DC bus capacitor C2 (shown in FIG. 7), the second neutral point connecting busbar 17 can be electrically connected to the neutral point N (shown in FIG. 7), the negative side conductor 19 can be electrically connected to the negative terminal of the phase capacitor C3 (shown in FIG. 7), and the second alternating-current connecting busbar 14 can be electrically connected to the alternating-current terminal AC (shown in FIG. 7).

In view of the foregoing, the connection framework provided by the second embodiment has the following characteristics: the connecting elements are composed of a combination of connecting busbars (such as the copper busbar) and insulated wires, as compared with other products and patents in which all the connecting elements are busbars; in this way, the present disclosure effectively avoid the problem of partial discharge resulted from the high-voltage during the connecting process of the system; there are only two layers of connecting busbar for connecting the half bridge arms, the structure is simple and the manufacturing cost is reduced.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A five-level rectifier comprising at least one phase bridge arm, the at least one phase bridge arm comprising:
an upper-half bridge arm circuit module comprising a first power semiconductor switch unit, a second power semiconductor switch unit, a first diode unit, a second diode unit, a first connecting busbar, a first insulated wire and a first transfer busbar, wherein the first diode unit is connected to the second diode unit in series, a connection point between the first power semiconductor switch unit and the second power semiconductor switch unit is connected to a positive terminal of a phase capacitor, the first diode unit is connected to a positive terminal of a first direct-current (DC) bus capacitor, the first connecting busbar is connected to the first diode unit and the second diode unit, the first transfer busbar is connected to the first power semiconductor switch unit and the second power semiconductor switch unit, and the first insulated wire is connected to the first transfer busbar and the first connecting busbar; and
an lower-half bridge arm circuit module comprising a third power semiconductor switch unit, a fourth power semiconductor switch unit, a third diode unit, a fourth diode unit, a second connecting busbar, a second insulated wire and a second transfer busbar, wherein the third diode unit is connected to the fourth diode unit in series, a connection point between the third power semiconductor switch unit and the fourth power semiconductor switch unit is connected to a negative terminal of the phase capacitor, the fourth diode unit is connected to a negative terminal of a second direct-current (DC) bus capacitor, the second diode unit and the third diode unit are connected to a neutral point connected between the first DC bus capacitor and the second DC bus capacitor, the second power semiconductor switch unit and the third power semiconductor switch unit are connected to an alternating-current terminal, the second connecting busbar is connected to the third diode unit and the fourth diode unit, the second transfer busbar is connected to the third power semiconductor switch unit and the fourth power semiconductor switch unit, the second insulated wire is connected to the second connecting busbar and the second transfer busbar, and the upper-half bridge arm circuit module and the lower-half bridge arm circuit module are disposed side by side and face each other.

2. The five-level rectifier of claim 1, wherein the first diode unit, the second diode unit and the first power semiconductor switch unit and the second power semiconductor switch unit are arranged in a straight line, and the second diode unit is positioned between the first diode unit and a series of the first power semiconductor switch unit and the second power semiconductor switch unit; the fourth diode unit, the third diode unit and the third power semiconductor switch unit and the fourth power semiconductor switch unit are arranged in a straight line, and the third diode unit is positioned between the fourth diode unit and a series of the third power semiconductor switch unit and the fourth power semiconductor switch unit.

3. The five-level rectifier of claim 1, wherein the first power semiconductor switch unit and the second power semiconductor switch unit comprise a first plurality of power semiconductor switch modules and a first plurality of series busbars, and the power semiconductor switch modules are connected in series through the series busbars; the third power semiconductor switch unit and the fourth power semiconductor switch unit comprises a second plurality of power semiconductor switch modules and a second plurality of series busbars, and the power semiconductor switch modules are connected in series through the series busbars; each of the first diode unit, the second diode unit, the third diode unit and the fourth diode unit comprises a plurality of diode modules and a plurality of series busbars, and the diode modules are connected in series through the series busbars.

4. The five-level rectifier of claim 1, wherein the first diode unit faces the fourth diode unit, the second diode unit faces the third diode unit, and the first power semiconductor switch unit and the second power semiconductor switch unit face the third power semiconductor switch unit and the fourth power semiconductor switch unit.

5. The five-level rectifier of claim 1, wherein the upper-half bridge arm circuit module further comprises a positive conductor of the capacitance bus connecting the first diode unit to the positive terminal of the first DC bus capacitor; the lower-half bridge arm circuit module further comprises a negative conductor of the capacitance bus connecting the fourth diode unit to the negative terminal of the second DC bus capacitor.

6. The five-level rectifier of claim 1, wherein the upper-half bridge arm circuit module further comprises a first alternating-current connecting busbar connecting the second power semiconductor switch unit to the alternating-current terminal; the lower-half bridge arm circuit module further comprises a second alternating-current connecting busbar connecting the third power semiconductor switch unit to the alternating-current terminal.

7. The five-level rectifier of claim 1, wherein the upper-half bridge arm circuit module comprises a positive side conductor connecting the connection point between the first power semiconductor switch unit and the second power semiconductor switch unit to the positive terminal of the phase capacitor; the lower-half bridge arm circuit module comprises a negative side conductor connecting the connection point between the third semiconductor switch unit and the fourth power semiconductor switch unit to the negative terminal of the phase capacitor.

8. The five-level rectifier of claim 1, wherein the upper-haft bridge arm circuit module further comprises a first neutral point connecting busbar connecting the second diode unit to the neutral point; the lower-half bridge arm circuit module further comprises a second neutral point connecting busbar connecting the third diode unit to the neutral point.

9. The five-level rectifier of claim 8, wherein the upper-haft bridge arm circuit module further comprises an insulating board disposed on the first diode unit and the second diode unit, and the first neutral point connecting busbar is disposed on the insulating board.

10. The five-level rectifier of claim 7, wherein the lower-half bridge arm circuit module further comprises an insulating board disposed on the third diode unit and the fourth diode unit, and the second neutral point connecting busbar is disposed on the insulating board.

11. A five-level rectifier comprising at least one phase bridge arm, and the at least one phase bridge arm comprising:
an upper-half bridge arm circuit module comprising a first power semiconductor switch unit, a second power semiconductor switch unit, a fifth power semiconductor switch unit, a first diode unit, a first connecting busbar, a first insulated wire and a first transfer busbar, wherein the first diode unit is connected to the fifth power semiconductor switch unit in series, a connection point between the first power semiconductor switch unit and the second power semiconductor switch unit is connected to the positive terminal of the phase capacitor, the first diode unit is connected to a positive terminal of a first direct-current (DC) bus capacitor, the first connecting busbar is connected to the first diode unit and the fifth power semiconductor switch unit, the first transfer busbar is connected to the first power semiconductor switch unit and the second power semiconductor switch unit, and the first insulated wire is connected to the first transfer busbar and the first connecting busbar; and
a lower-half bridge arm circuit module comprising a third power semiconductor switch unit, a fourth power semiconductor switch unit, a sixth power semiconductor switch unit, a second diode unit, a second connecting busbar, a second insulated wire and a second transfer busbar, wherein the sixth power semiconductor switch unit is connected to the second diode unit in series, a connection point between the third power semiconductor switch unit and the fourth power semiconductor switch unit is connected to the negative terminal of the phase capacitor, the second diode unit is connected to a negative terminal of a second direct-current (DC) bus capacitor, the fifth power semiconductor switch unit and the sixth power semiconductor switch unit are connected to a neutral point connected between the first DC bus capacitor and the second DC bus capacitor, the second power semiconductor switch unit and the third power semiconductor switch unit are connected to an alternating-current terminal, the second connecting busbar is connected to the sixth power semiconductor switch unit and the second diode unit, the second transfer busbar is connected to the third power semiconductor switch unit and the fourth power semiconductor switch unit, the second insulated wire is connected to the second connecting busbar and the second transfer busbar, and the upper-half bridge arm circuit module and the lower-half bridge arm circuit module are disposed side by side and face each other.

12. The five-level rectifier of claim 11, wherein the first diode unit, the fifth power semiconductor switch unit and the first power semiconductor switch unit and the second power semiconductor switch unit are arranged in a straight line, and the fifth power semiconductor switch unit is positioned between the first diode unit and a series of the first power semiconductor switch unit and the second power semiconductor switch unit; the second diode unit, the sixth power semiconductor switch unit and the third power semiconductor switch unit and the fourth power semiconductor switch unit are arranged in a straight line, and the sixth power semiconductor switch unit is positioned between the second diode unit and a series of the third power semiconductor switch unit and the fourth power semiconductor switch unit.

13. The five-level rectifier of claim 11, wherein the first power semiconductor switch unit and the second power semiconductor switch unit comprise a first plurality of power semiconductor switch modules and a first plurality of series busbars, and the first plurality of the power semiconductor switch modules are connected in series through the first plurality of the series busbars; the third power semiconductor switch unit and the fourth power semiconductor switch unit comprise a second plurality of power semiconductor switch modules and a second plurality of series busbars, and the second plurality of the power semiconductor switch modules are connected in series through the second plurality of the series busbars; each of the fifth power semiconductor switch unit and the sixth power semiconductor switch unit comprises a third plurality of power semiconductor switch modules and a third plurality of series busbars, and the third plurality of the power semiconductor switch modules are connected in series through the third plurality of the series busbars; each of the first diode unit and the second diode unit comprises a plurality of diode modules and a plurality of series busbars, and the diode modules are connected in series through the series busbars.

14. The five-level rectifier of claim 11, wherein the first diode unit faces the second diode unit, the fifth power semiconductor switch unit faces the sixth power semiconductor switch unit, and the first power semiconductor switch unit and the second power semiconductor switch unit face the third power semiconductor switch unit and the fourth power semiconductor switch unit.

15. The five-level rectifier of claim 11, wherein the upper-half bridge arm circuit module further comprises a positive conductor of the capacitance bus connecting the first diode unit to the positive terminal of the first DC bus capacitor; the lower-half bridge arm circuit module further comprises a negative conductor of the capacitance bus connected to the second diode unit and the negative terminal of the second DC bus capacitor.

16. The five-level rectifier of claim 11, wherein the upper-half bridge arm circuit module further comprises a first alternating-current connecting busbar connecting the second power semiconductor switch unit to the alternating-current terminal; the lower-half bridge arm circuit module further comprises a second alternating-current connecting busbar connected to the third power semiconductor switch unit and the alternating-current terminal.

17. The five-level rectifier of claim 11, wherein the upper-half bridge arm circuit module comprises a positive side conductor connected to the connection point between the first power semiconductor switch unit and the second power semiconductor switch unit and the positive terminal of the phase capacitor; the lower-half bridge arm circuit module comprises a negative side conductor connected to the connection point between the third power semiconductor switch unit and the fourth power semiconductor switch unit and the negative terminal of the phase capacitor.

18. The five-level rectifier of claim 11, wherein the upper-half bridge arm circuit module further comprises a first neutral point connecting busbar connecting the fifth power semiconductor switch unit to the neutral point; the lower-half bridge arm circuit module further comprises a second neutral point connecting busbar connected to the sixth power semiconductor switch unit and the neutral point.

19. The five-level rectifier of claim 18, wherein the upper-haft bridge arm circuit module further comprises an insulating board disposed on the first diode unit and the fifth power semiconductor switch unit, and the first neutral point connecting busbar is disposed on the insulating board.

20. The five-level rectifier of claim 18, wherein the lower-half bridge arm circuit module further comprises an insulating board disposed on the second diode unit and the sixth power semiconductor switch unit, and the second neutral point connecting busbar is disposed on the insulating board.

* * * * *